United States Patent Office 3,554,882
Patented Jan. 12, 1971

3,554,882
POLYMERIZABLE MIXTURES
Harvey A. Hodes, James F. Sobieski, and Michael C. Zerner, Eatontown, N.J., assignors to the United States of America as represented by the Secretary of the Army
No Drawing. Filed Sept. 26, 1967, Ser. No. 670,808
Int. Cl. C08f 1/00
U.S. Cl. 204—72     1 Claim

ABSTRACT OF THE DISCLOSURE

Solutions are provided in which rapid polymerization can be initiated by the passing of an electric current therethrough. The polymer thus formed has excellent adhering properties to metallic cathodes. The solution is comprised of at least one polymerizable monomer, a strong acid, an electrochemical initiator, and a solvent in which the monomer, acid and electro-chemical initiator are soluble.

The invention described herein may be manufactured, used and licensed by or for the Government for governmental purposes without the payment to us of any royalty thereon.

BACKGROUND OF THE INVENTION

This invention relates in general to polymerizable solutions and, in particular, to certain solutions in which polymerization can be initiated by passing an electric current through the solution.

It has been known that polymerization can be initiated in solutions containing suitable monomers by passing an electric current through the solution. In the past, however, electrically initiated polymerization has been slow and difficult to control. That is, once polymerization was started electrically, often the polymerization would continue after the current was shut off; and in many instances, the entire monomer solution would harden.

A specific object of this invention is to provide a solution wherein polymerization, once electrically initiated, will be rapid and controllable. A still further object of this invention is to provide such a solution wherein polymerization, once initiated, will be able to rapidly form a uniformly thick and adherent polymer coating on a metallic surface within the solution.

SUMMARY OF THE INVENTION

According to the invention, a solution is provided comprised of a polymerizable monomer, a strong acid, an electrochemical initiator, and a solvent in wihch the monomer, acid, and electrochemical initiator are soluble. If desired, certain sensitizers can be added to the polymerizable solutions to make polymerization more rapid.

The polymerizable monomer or monomers used are ethylenic unsaturated materials such as acrylamide, other acrylic compounds, substituted acrylic compounds, vinyl compounds, substituted vinyl compounds, etc. They may also be aromatic unsaturated compounds such as styrene or cyclics such as N-vinyl-2-pyrrolidone.

The solvent used is one in which the monomer is soluble and the polymer is insoluble. Water and alcohol are examples of suitable solvents depending on the monomer. When using water as the solvent, the polymerizable monomer will comprise about 3 to 70 percent by weight of the solution; the acid used will be present in an amount such that the pH of the solution is less than 3, and the electrochemical initiator will comprise about 0.03 to 2 percent by weight of the solution.

The electrochemical initiator used is generally one that is soluble in the solvent. Hydrogen peroxide, persulfates, perborates, and organic peroxides have been found to be suitable initiators.

The acid used is one having an ionization constant of at least $10^{-5}$ as exemplified by hydrochloric acid, sulfuric acid, or mono chloroacetic acid. A highly acidic solution is required for rapid polymerization. For a specific composition, the amount of acid used for the most rapid polymerization must be adjusted. A pH of less than 3 is desirable for the most rapid polymerization. The particular acid used will also depend on the specific metallic surface to be coated with polymer; that is, the acid must not attack the surface metal immersed in the solution and being coated. The acid used also must not adversely affect the monomer or polymer formed.

As mentioned above, certain sensitizers can be added to the polymerizable solutions to make them faster. There are a great many of such compounds that can be used. Examples of such compounds are secondary and tertiary amines and beta substituted ketones.

DETAILED DESCRIPTION OF THE PREFERRED EMBODIMENT

To 10 ml. of a water solution containing 10 percent by weight of acrylamide, 1 percent N-N' methylenebisacrylamide and 2 percent N-N' ethylene bisacrylamide is added 0.5 ml. of concentrated HCl and 0.5 ml. of 3 percent hydrogen peroxide. This solution can be stored with no autopolymerization for over 6 months. Into this solution two steel electrodes are placed. The two electrodes are kept 1 cm. apart. At 22.5 volts, a uniform polymer is formed on the cathode in less than $\frac{1}{1000}$ of a second. At higher voltages, polymer is formed even more rapidly. After the electrodes are withdrawn from the solution no polymerization occurs. Again the solution is stable for long periods of time.

The polymer formed is very easily dyed by simple immersion in a dye solution. When the polymer has completely dried it has high electrical resistivity.

The mechanism of this initiation scheme probably involves the protonation of the peroxide fragment, giving the fragment a net positive charge. Upon electrolysis, this positive fragment drifts to the cathode where it gains an electron and forms a free radical capable of bringing about vinyl polymerization, i.e., hydrogen peroxide:

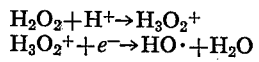
$$H_2O_2 + H^+ \rightarrow H_3O_2^+$$
$$H_3O_2^+ + e^- \rightarrow HO\cdot + H_2O$$

where $e^-$ is an electron from the cathode, and ·OH, hydroxyl free radical, which initiates the polymerization. For perborate:

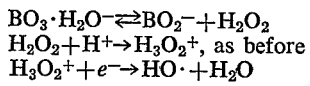
$$BO_3\cdot H_2O \rightleftarrows BO_2^- + H_2O_2$$
$$H_2O_2 + H^+ \rightarrow H_3O_2^+, \text{ as before}$$
$$H_3O_2^+ + e^- \rightarrow HO\cdot + H_2O$$

For organic peroxides:

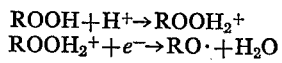
$$ROOH + H^+ \rightarrow ROOH_2^+$$
$$ROOH_2^+ + e^- \rightarrow RO\cdot + H_2O$$

Here, RO· initiates polymerization, or R·, upon further decomposition, initiates polymerization. Also possible is

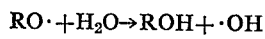
$$RO\cdot + H_2O \rightarrow ROH + \cdot OH$$

where hydroxyl free radical (·OH) causes the polymerization. Whether RO·, R· or ·OH causes the polymerization with organic peroxide is not presently known. At best, it is a function of which organic peroxide is used, and which free radical is most stable. In aqueous solutions, formation of ·OH is especially favored. For persulfate:

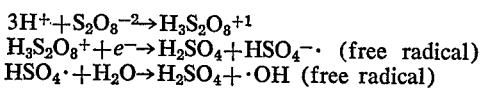
$$3H^+ + S_2O_8^{-2} \rightarrow H_3S_2O_8^{+1}$$
$$H_3S_2O_8^+ + e^- \rightarrow H_2SO_4 + HSO_4^-\cdot \text{ (free radical)}$$
$$HSO_4\cdot + H_2O \rightarrow H_2SO_4 + \cdot OH \text{ (free radical)}$$

This system of polymerization initiation has many advantages over other electrolytically initiated systems. First, polymer formation is extremely fast, requiring only modest amounts of current. Second, the polymer formed is uniform. Third, the polymer is formed at the cathode, whereas most schemes form polymer at the anode. One advantage to this is that anode materials pit, or partially dissolve, upon electrolysis, whereas cathodes do not. Fourth, polymer adheres tightly to the electrode. Fifth, polymerization completely stops when the electrolysis stops. Most systems, once initiated, continue to polymerize until the entire bulk has polymerized.

These polymerizable solutions have many uses where it is necessary to coat metal with a polymer layer, as with wire for insulation, or steel with a corrosion resistant layer. They can also be used for electrically initiated polymerization for image recording.

This invention should not be construed as limited to only aqueous formulations, or formulations in which the monomer is soluble in the media. The solvent should, however, be somewhat polar, to allow the ionization or partial ionization of a compatible acid, and of course, ionic conducting. Alcohols, dioxane, and dimethylformamide are examples of other solvents used with some success, although none of these systems shows the speed of water formulations at a given voltage. This is probably caused by less ionized material in these solvents and lower ionic mobilities, both reducing electrical conductance in these systems. Emulsions of monomers in water also polymerize with the disclosed mechanism. Such systems, however, are much less efficient than if the monomer were water soluble. (For example, 10 percent conc. HCl solution, 30 percent acrylonitrile, 0.1 percent tertiary-butyl hydroperoxide in water, and an emulsifier to hold the acrylonitrile in suspension, polymerizes on the cathode upon the application of an electric potential.)

The foregoing description is to be considered merely as illustrative of the invention and not in limitation thereof.

What is claimed is:

1. An electrically initiated polymerization method of forming a uniform and tightly adhering polymer coating on the cathode of an electrolytic cell in less than $\frac{1}{1000}$ of a second comprising maintaining an electric potential of about 22.5 volts between two steel electrodes kept 1 cm. apart and immersed in an aqueous eelctrolytic solution containing 10 percent by weight of acrylamide, 1 percent N-N' methylenebisacrylamide and 2 percent N-N' ethylene bisacrylamide, 0.5 ml. of concentrated HCl and 0.5 ml. of 3 percent hydrogen peroxide, said polymerization stopping when the electrolysis stops.

References Cited

UNITED STATES PATENTS

| 3,434,946 | 3/1969 | Ehrig et al. | 204—72 |
| 2,726,204 | 12/1955 | Park et al. | 204—72 |

OTHER REFERENCES

Hydrogen Peroxide in Organic Chemistry by Wallace, September 1962, p. 106.

Handbook of Chemistry and Physics, 32nd ed., p. 1493.

JOHN H. MACK, Primary Examiner

R. L. ANDREWS, Assistant Examiner